(12) United States Patent
Yang et al.

(10) Patent No.: US 8,653,932 B2
(45) Date of Patent: Feb. 18, 2014

(54) CONDUCTIVE COMPOSITE MATERIAL WITH POSITIVE TEMPERATURE COEFFICIENT OF RESISTANCE AND OVERCURRENT PROTECTION COMPONENT

(75) Inventors: Quan-quan Yang, Shanghai (CN); Zhengping Liu, Shanghai (CN); Yutang Liu, Shanghai (CN); Daohua Gao, Shanghai (CN); Jun Wang, Shanghai (CN); Congwu Li, Shanghai (CN)

(73) Assignee: Shanghai Changyuan Wayon Circuit Protection Co., Ltd., Shanghai (CN)

( * ) Notice: Subject to any disclaimer, the term of this patent is extended or adjusted under 35 U.S.C. 154(b) by 0 days.

(21) Appl. No.: 13/574,712

(22) PCT Filed: Sep. 13, 2010

(86) PCT No.: PCT/CN2010/076822
§ 371 (c)(1),
(2), (4) Date: Jul. 23, 2012

(87) PCT Pub. No.: WO2012/003661
PCT Pub. Date: Jan. 12, 2012

(65) Prior Publication Data
US 2013/0094116 A1    Apr. 18, 2013

(30) Foreign Application Priority Data

Jul. 8, 2010   (CN) .......................... 2010 1 0219600

(51) Int. Cl.
*H01C 7/10* (2006.01)

(52) U.S. Cl.
USPC ...................................... 338/22 R

(58) Field of Classification Search
USPC ............................. 338/20, 22 R, 13
See application file for complete search history.

(56) References Cited

U.S. PATENT DOCUMENTS

| | | | |
|---|---|---|---|
| 6,358,438 B1 * | 3/2002 | Isozaki et al. ............... | 252/511 |
| 6,452,476 B1 * | 9/2002 | Handa ........................ | 338/22 R |
| 7,286,038 B1 * | 10/2007 | Wang et al. ................ | 338/22 R |
| 7,304,562 B2 * | 12/2007 | Shirai et al. ............... | 338/22 R |
| 7,382,224 B2 * | 6/2008 | Wang et al. ................ | 338/22 R |
| 7,920,045 B2 * | 4/2011 | Chandler et al. ........... | 338/22 R |

* cited by examiner

*Primary Examiner* — Kyung Lee

(57) ABSTRACT

A PTC conductive composite material and the overcurrent protection device made of the material are disclosed. The PTC conductive composite material includes: (a) A matrix of crystalline polymer material at least, occupies 20%-70% of the volume fraction of the PTC conductive composite material, (b) One kind of conductive filler occupies 30%-80% of the volume fraction of the material. The solid solution conductive filler is uniformly dispersed in the polymer material, whose average particle size ranges from 0.1 μm to 10 μm, and the volume resistivity is no more than 300 μΩ·cm. The overcurrent protection device prepared by using the PTC conductive composite material as described above includes two metal foils, which are made into a sandwich, separated by a layer of the PTC conductive composite material.
And the advantages of the overcurrent protection device of the invention are low resistance, good reproducibility of resistance and well PTC intensity.

7 Claims, 2 Drawing Sheets

CONDUCTIVE COMPOSITE MATERIAL WITH POSITIVE TEMPERATURE COEFFICIENT OF RESISTANCE AND OVERCURRENT PROTECTION COMPONENT

FIELD OF THE INVENTION

The present invention relates to surface mount overcurrent protection component with PTC behavior and more particularly to conductive composite material with positive temperature coefficient (PTC) of resistance and an over-current protection component.

BACKGROUND OF THE INVENTION

The resistance of positive temperature coefficient (PTC) conductive composite materials maintains extremely low under normal temperature, and can react to temperature changes very quickly. When an overcurrent or an over-temperature occurs, these materials exhibit a sharp increase in resistivity which leads to open circuit and the protection of the circuit or the device. Therefore, this kind of conductive composite materials has been widely used as circuit protection component.

The PTC conductive composite materials usually include a matrix of crystalline polymer material in which conductive fillers are uniformly dispersed on the macroscopic. The polymers are polyolefin and their copolymers generally, such as polyethylene and ethylene-vinyl acetate copolymer. Meanwhile, the conductive filler is generally carbon black, metal powder or conductive ceramic powder. As the special aggregate structure of carbon black and polar group on its surface, the carbon black and polymer adhere well. So that the PTC materials, with carbon black as conductive filler, have good resistance stability. However, because of the limited conductive capacity of carbon black, it can't satisfy the need of low resistance. At the same time, the PTC materials, with mental power as conductive filler, have extremely resistance. But it needs encapsulation of conductive composite materials to prevent oxidation of the metal powder in the air, which can lead to the increasing of resistance. Whereas, the volume of overcurrent protection devices can't be reduced effectively after encapsulated, which is difficult to meet the requirements of miniaturization of electronic components. To obtain low resistance and meet the requirements of miniaturization of electronic components, it tends to use the metal carbide ceramic powder (such as titanium carbide) as conductive filler of PTC conductive composite materials. But as poor combination of metal carbide ceramic powder and polymer, the reproducibility of resistance is difficult to control for this kind of conductive materials.

SUMMARY OF THE INVENTION

It is an object of the present invention to provide a conductive composite material with positive temperature coefficient (PTC).

The other object of the invention is to provide an overcurrent protection component with this PTC conductive composite material. And the component has low resistance at room temperature, good reproducibility of resistance and well PTC intensity.

The technical solution we present to solve the mentioned problems in this invention is to provide a PTC conductive composite material, which include:

A matrix of crystalline polymer material at least, occupies 20%-70% of the volume fraction of the PTC conductive composite material.

One kind of conductive filler occupies 30%-80% of the volume fraction of the material. The solid solution conductive filler is uniformly dispersed in the polymer material, whose average particle size ranges from 0.1μm to 10 μm, and the volume resistivity is no more than 300 μΩ·cm, Specifically, the volume fraction of crystalline polymer material could be 20, 25, 30, 35, 40, 45, 50, 55, 60, 65 or 70%; and the volume fraction of conductive filler could be 30, 35, 40, 45, 50, 55, 60, 65, 70, 75 or 80%.

The volume fraction of crystalline polymer material is preferably between 25% and 65%, more preferably from 30% to 60%.

The volume fraction of conductive filler is preferably between 35% and 75%, more preferably from 40% to 70%.

The average particle size of the conductive filler selected is preferably between 0.01 μm and 50 μm, more preferably from 0.1 μm to 10 μm.

Usually, the volume resistivity of the conductive filler is less than 500 μΩ·cm, more preferably less than 300 μΩ·cm, better preferably less than 100 μΩ·cm.

The conductive composite material can also contain other components, such as antioxidant, radiation cross-linking agent (often referred to radiation accelerator, crosslinking, agent or crosslinking accelerator, such as triallyl isocyanurate), coupling agent, dispersing agent, stabilizers, non-conductive fillers (such as magnesium hydroxide), flame retardants, Arc inhibitors or other components. These components usually account for up to 15% of the total volume of conductive composite materials, for example, 3,5,10 or 12%.

In addition to the above, the crystalline polymer is one of or the mixture of epoxy resin, polyethylene, polypropylene, polyvinylidene fluoride, ethylene-vinyl acetate copolymer, poly (methyl methacrylate) and ethylene-acrylic acid copolymer. And the polyethylene also includes high-density polyethylene, low-density polyethylene, linear low-density polyethylene and ultrahigh molecular weight polyethylene and so on.

Accordingly, the solid solution is metal carbide solid solution whose components include a mixture of two kinds or more of tantalum carbide, vanadium carbide, zirconium carbide, titanium carbide, niobium carbide, molybdenum carbide, hafnium carbide, chromium carbide, tungsten carbide, boron carbide and beryllium carbide.

Such as carbide tantalum-niobium carbide solid solution, chromium carbide-titanium carbide-tantalum carbide solid solution, titanium carbide-tungsten carbide-tantalum carbide solid solution, titanium carbide-tungsten carbide-niobium carbide solid solution, titanium carbide-tungsten carbide solid solution, titanium carbide-tungsten carbide-niobium carbide-tantalum carbide solid solution, tungsten carbide-tantalum carbide solid solution and titanium carbide-tantalum carbide solid solution and so on.

The overcurrent protection device is prepared by using the PTC conductive composite material as described above, Two metal foils are made into a sandwich, separated by a layer of the PTC conductive composite material, In addition to the above, the two metal foils have rough surfaces.

Accordingly, there is direct physical contact between rough surfaces of metal foils and the PTC conductive composite material layer, In addition to the above, the volume resistivity of overcurrent protection device is less than 0.1 Ω·cm at 25° C., and with good reproducibility of resistance and well PTC intensity.

The PTC conductive composite materials and the overcurrent protection device thereof in this invention could be prepared as follows:

At least one kind of the crystalline polymer and conductive filler are mixed into the equipment and kneaded at the temperature above melting temperature of the crystalline polymer. The mixing equipment could be internal mixer, open mill, single screw extruder or twin screw extruder, Then process the melt-mixed polymer into sheet by extrusion molding, compression molding and open mill sheeting. In general, the thickness of polymer sheet is 0.01~2.0 mm, preferably 0.05~1.0 mm, and the better is 0.1~0.5 mm to facilitate the processing.

The molding method of composite products is to make two metal foils into a sandwich, separated by a layer of the PTC conductive composite material. When this composite, product is divided into individual components, the metal foils play the role of electrodes. The method of dividing the composite product into individual components includes any method of isolating a single component from the composite product, such as punching, etching, scribing and laser cutting. The single component has a flat shape, that is to say there are two surfaces perpendicular to the direction of current flow, and the distance between two surfaces is very short, up to 3.0 mm, preferably up to 2.0 mm and particularly preferred up to 0.5 mm, such as 0.35 mm. The component can be any shape, such as square, triangular, circular, rectangular, ring, polygonal, or other irregular shapes. There is one metal foil with rough surface having direct physical contact with the polymer material sheet. The thickness of the metal foil up to 0.1 mm, preferably up to 0.07 mm, in particular, up to 0.05 mm, for example, 0.035 mm. All of nickel, copper, aluminum, zinc and their alloys can be applicable to the metal foil.

The stability of overcurrent protection device can be improved by the methods of crosslinking or heat treatment. Crosslinking can be radiation crosslinking or chemical crosslinking, for example, crosslinking promote agents, electron beam irradiation or Co60 irradiation, The required radiation dose of overcurrent protection devices is generally less than 100 Mrad, preferably 1~50 Mrad, better preferably 1~20 Mrad, Heat treatment may be annealing, thermal cycling, high and low temperature, such as 80° C./−40° C. high and low temperature, The temperature of annealing can be any temperature blow the decomposition temperature of PTC material layer, for example, the high-temperature annealing higher than the melting temperature of the conductive composite material substrate and low-temperature annealing below the melting temperature of substrate.

The resistivity of the overcurrent protection device of the present invention is less than 0.55 Ω·cm at 25° C., preferably less than 0.1 Ω·cm, better preferably 0.05 Ω·cm. So the resistance of the overcurrent protection device of the present invention is very low, such as 1.0 mΩ~20 mΩ.

The beneficial effects of the present invention are:

The resistivity of PTC conductive composite material of the present invention is very low, and the overcurrent protection device thereof has good reproducibility of resistance and well FTC intensity, even when there are filled amount of conductive filler in the conductive composite material sheet. In a conclusion, the overcurrent protection device of the present invention has very low resistance at room temperature and well PTC intensity.

DETAILED DESCRIPTION OF THE INVENTION

The following examples demonstrate the further detailed description of embodiments of the present invention.

EXAMPLE 1

Table 1 shows the composition of the conductive composite material of the overcurrent protection device.

Among the materials, polymer A is high-density polyethylene, whose crystalline melting temperature is 135° C. and density is 0.952 g/cm$^3$. Polymer B is high-density polyethylene, whose crystalline melting temperature is 134° C. and density is 0.954 g/cm$^3$. Conduct filler A is titanium carbide, whose particle size is less than 3 μm, the total carbon content≤19.4%, and the density is 4.93 g/cm$^3$. Conduct filler B is titanium carbide-tantalum carbide-tungsten carbide solid solution, whose particle size less than 10 μm.

The preparation of the overcurrent protection device is as followed. Set the temperature of the internal mixer at 180° C. and the speed is 30 rev/min. After 3 minutes of mixing crystalline polymer, add a quarter of the weight of the conductive filler. The add one quarter every 2 minutes. After the last addition, mix for 15 minutes, and then get the PTC conductive composite material. The melt-mixed conductive composites are made to a thickness of 0.20~0.25 mm conductive composite material through open mill sheeting.

Figure 1:
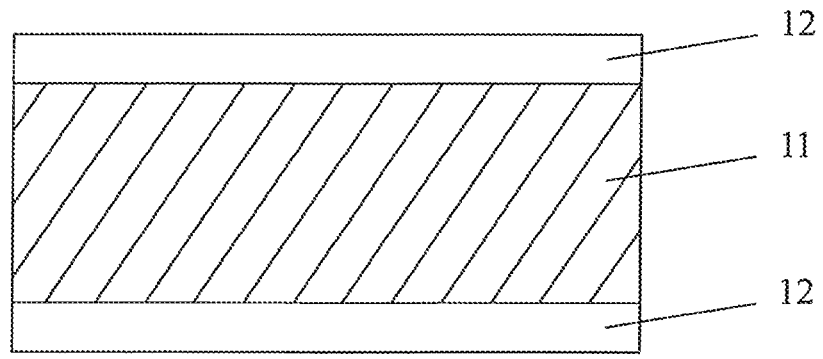
FIG. 1 illustrates the structure diagram of the overcurrent protection device.
Figure 2:
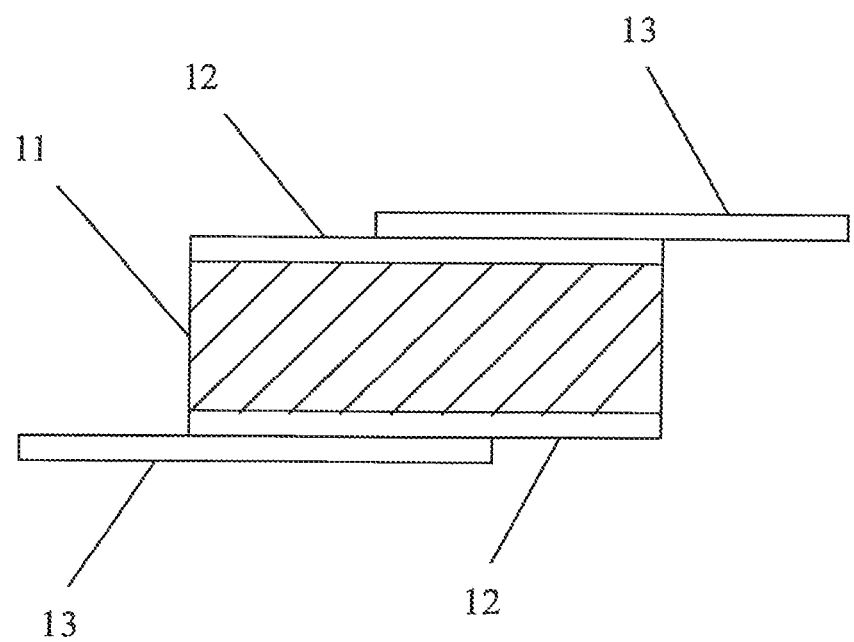
FIG. 2 illustrates the structure diagram of the overcurrent protection device with a pin.

FIG. 1 illustrates the structure diagram of the overcurrent protection device. Place the conductive composite material layer (11) between the two symmetry metal foils (12). There is one metal foil (12) with rough surface having direct physical contact with the PTC conductive composite material layer (11). Tight the conductive composite material (11) and metal foils (12) together by hot pressing method. The temperature of hot pressing is 180° C. Warm up for 5 minutes firstly, and then press at 5 Mpa for 3 minutes and hot press at 12 Mpa for 10 minutes, and cold press for 8 minutes. Punch the materials into 3*4 mm individual components by mold. At last, according to FIG. 2, which illustrates the structure diagram of the overcurrent protection device with a pin, connect the two metal pins (13) to the surface of the metal foils (12) by the reflow method to get the overcurrent protection device.

Figure 3:
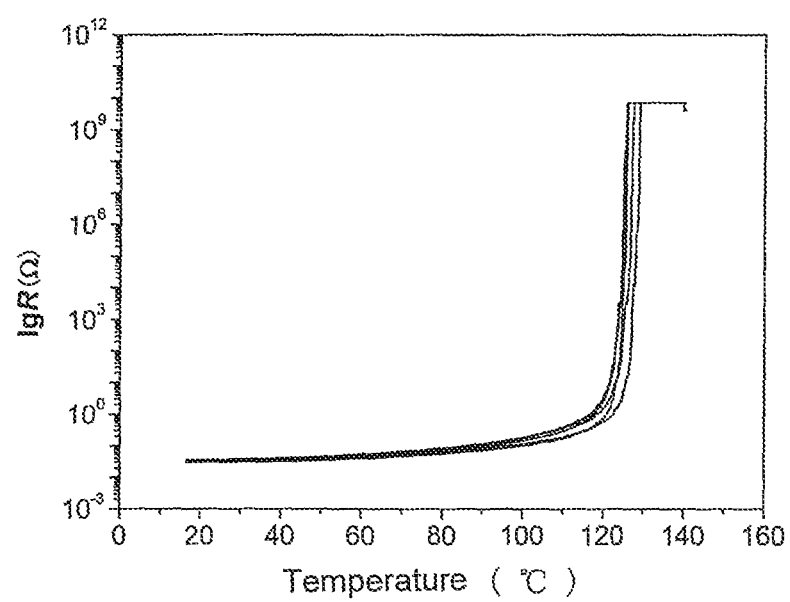
FIG. 3 illustrates the resistance-temperature curve of the overcurrent protection device applied to Example 1.

FIG. 3 illustrates the resistance-temperature curve of the overcurrent protection device applied to Example 1. The resistivity of overcurrent protection device is very low at 25° C. As the temperature increases, the resistance increases slowly. When the temperature increases to about 130° C., the resistivity of overcurrent protection device exhibits a sharp increase about 10 orders of magnitude. Then the overcurrent protection device becomes an insulator from a conductor, which leads to open circuit and the protection of the circuit or the device.

EXAMPLE 2

The preparation of PTC conductive composite material and the overcurrent protection device is the same with that in Example 1. But the volume fraction of crystalline polymer A is decreased to 20% from 34%, and the volume fraction of crystalline polymer B is increased to 20% from 6%. Table 1 shows the formula of the conductive composite material and the electrical characteristics of the overcurrent protection device.

EXAMPLE 3

The preparation of PTC conductive composite material and the overcurrent protection device is the same with that in Example 1. But the volume fraction of crystalline polymer A is decreased to 28% from 34%, and the volume fraction of crystalline polymer B is increased to 12% from 6%. Table 1 shows the formula of the conductive composite material and the electrical characteristics of the overcurrent protection device.

EXAMPLE 4

The preparation of PTC conductive composite material and the overcurrent protection device is the same with that in Example 1. But the volume fraction of crystalline polymer A is decreased to 12% from 34%, and the volume fraction of crystalline polymer B is increased to 28% from 6%. Table 1 shows the formula of the conductive composite material and the electrical characteristics of the overcurrent protection device.

COMPARATIVE EXAMPLE 1

The preparation of PTC conductive composite material and the overcurrent protection device is the same with that in Example 1. But the conductive filler is changed to titanium carbide. Table 1 shows the formula of the conductive composite material and the electrical characteristics of the overcurrent protection device.

COMPARATIVE EXAMPLE 2

The preparation of PTC conductive composite material and the overcurrent protection device is the same with that in Example 1. But the conductive filler is changed to titanium carbide, and the volume fraction of crystalline polymer A is increased to 37% from 34%, and the volume fraction of crystalline polymer B is decreased to 3% from 6%. Table 1 shows the formula of the conductive composite material and the electrical characteristics of the overcurrent protection device.

COMPARATIVE EXAMPLE 3

The preparation of PTC conductive composite material and the overcurrent protection device is the same with that in Example 1. But the conductive filler is changed to titanium carbide, and the volume fraction of crystalline polymer A is decreased to 24% from 34%, and the volume fraction of crystalline polymer B is increased to 16% from 6%. Table 1 shows the formula of the conductive composite material and the electrical characteristics of the overcurrent protection device.

The resistivity of overcurrent protection device is measured by four-electrode method.

Table 1 illustrates the resistance data of over-current protection component of present invention, which is tested at 25° C. and 1 hour after energized in 6V/50 A condition. R represents the resistance of over-current protection component before connecting the two metal pins (13) to the surface of the metal foils (12) by the reflow method. $R_0$ indicates the resistance of finished device after connecting. $R_1$ states the resistance tested at 25° C. and 1 hour after continuous energized (6V/50 A) for 60 seconds. $R_{25}$ represents the resistance tested at 25° C. and 1 hour after 25 times cycle of continuous energized (6V/50 A) for 60 seconds and de-energized for 6 seconds. $R_{50}$ indicates the resistance tested at 25° C. and 1 hour after 50 times cycle of continuous energized (6V/50 A) for 60 seconds and de-energized for 6 seconds. $R_{100}$ states the resistance tested at 25° C. and 1 hour after 100 times cycle of continuous energized (6V/50 A) for 60 seconds and de-energized for 6 seconds.

TABLE 1

| | Examples/Comparative Examples | | | | | | |
|---|---|---|---|---|---|---|---|
| | Example 1 | Example 2 | Example 3 | Example 4 | Comparative Example 1 | Comparative Example 2 | Comparative Example 3 |
| | Formula (volume fraction) | | | | | | |
| polymer A | 34 | 20 | 28 | 12 | 34 | 37 | 24 |
| polymer B | 6 | 20 | 12 | 28 | 6 | 3 | 16 |
| filler A | | | | | 60 | 60 | 60 |
| filler B | 60 | 60 | 60 | 60 | | | |
| | Electrical Characteristic | | | | | | |
| R (mΩ) | 2.5 | 3.7 | 2.9 | 4.2 | 5.9 | 3.8 | 6 |
| $R_0$ (mΩ) | 7.4 | 10.9 | 8.9 | 9.4 | 15.3 | 12.3 | 20.1 |
| $R_1$ (mΩ) | 10.0 | 15.1 | 10.6 | 12.7 | 21.2 | 27.7 | 24.8 |
| $R_{25}$ (mΩ) | 13.2 | 25.5 | 17.3 | 18.5 | 58.3 | 69.1 | 29.8 |
| $R_{50}$ (mΩ) | 17.2 | 32.3 | 24.6 | 27.9 | 140.2 | 144.4 | 41.6 |
| $R_{100}$ (mΩ) | 24.1 | 57.5 | 39.0 | 46.3 | 476.8 | 427.0 | 63.4 |

As can be seen from Table 1, Example 1~4 and Comparative Example 1~3 have the same volume fraction of conductive filler. However, the conductive filler of Example 1~4 are two or more kinds of metal carbide solid solution, and their resistances of finished device are smaller than that in Comparative Example 1~3, whose conductive fillers are titanium carbide. After 100 times impact of current (6V/50 A), the resistances of Example 1~4 are all less than 60 mΩ, while the resistances of Comparative Example 1~2 are all more than 400 mΩ without good resistance reproducibility. Although the resistance of Comparative Example 3 is small, the resistance of the finished device is more than 20 mΩ, which means it can't satisfy the need of low resistance, FIG. 3 shows that the overcurrent protection device, whose conductive filler is carbide metal solid solution, has excellent PTC intensity.

As the resistance of the conductive filler is very low, the overcurrent protection device of the invention, using PTC conductive composite material, has very low resistance, good reproducibility of resistance and well PTC intensity. Also, the conductive filler used is not easily oxidized, so there is no need for encapsulation of conductive composite materials to prevent oxidation. So it can be used to prepare small size of the overcurrent protection device, such as the load current of 1206, 0805, 0603 and 0402.

The above-described embodiments of the present invention are intended to be illustrative only. The characteristics of the invention may more than the content in public above. Thus, it is to be understood that, the protection scope of the invention not only includes the illustrated contents, but also includes all the combinations of the contents in different parts and all the modifications and variations of the present invention without departing from the scope of the claims.

What is claimed is:

1. A positive-temperature coefficient (PTC) conductive composite material, comprising:
    a matrix of crystalline polymer material at least, occupying 20%-70% of the volume fraction of the PTC conductive composite material; and
    a conductive filler occupying remaining volume fraction of the PTC conductive composite material, wherein the conductive filler is dispersed in the crystalline polymer material, the conductive filler having an average particle size ranging from 0.1 μm to 10 μm, and a volume resistivity no more than 300 μΩ·cm, and wherein the conductive filler is one of tantalum carbide-niobium carbide solid solution, chromium carbide-titanium carbide-tantalum carbide solid solution, titanium carbide-tungsten carbide-tantalum carbide solid solution, titanium carbide-tungsten carbide-niobium carbide solid solution, titanium carbide-tungsten carbide solid solution, titanium carbide-tungsten carbide-niobium carbide-tantalum carbide solid solution, tungsten carbide-tantalum carbide solid solution, and titanium carbide-tantalum carbide solid solution.

2. The PTC conductive composite material of claim 1, wherein the crystalline polymer material is one of epoxy resin, polyethylene, polypropylene, polyvinylidene fluoride, ethylene-vinyl acetate copolymer, poly (methyl methacrylate) and ethylene-acrylic acid copolymer or a mixture thereof.

3. A positive-temperature coefficient (PTC) conductive composite material, comprising:
    a matrix of crystalline polymer material at least, occupying 20%-70% of the volume fraction of the PTC conductive composite material; and
    a conductive filler occupying remaining volume fraction of the PTC conductive composite material, wherein the conductive filler is dispersed in the crystalline polymer material, and wherein the conductive filler comprising a metal carbide solid solution of two or more of tantalum carbide, vanadium carbide, zirconium carbide, titanium carbide, niobium carbide, molybdenum carbide, hafnium carbide, chromium carbide, tungsten carbide, boron carbide and beryllium carbide.

4. An over-current protection component, comprising:
    a layer of positive-temperature coefficient (PTC) conductive composite material; and
    two metal foils disposed on opposite sides of the layer of the PTC conductive composite material. the conductive composite material comprising:
    a matrix of crystalline polymer material at least, occupying 20%-70% of volume fraction of the PTC conductive composite material, and
    a conductive filler occupying remaining volume fraction of the PTC conductive composite material, wherein the conductive tiller is dispersed in the crystalline polymer material and has an average particle size ranging from 0.1 μm to 10 μm, and a volume resistivity no more than 300 μΩ·cm, and wherein the conductive filler is one of tantalum carbide-niobium carbide solid solution, chromium carbide-titanium carbide-tantalum carbide solid solution, titanium carbide-tungsten carbide-tantalum carbide solid solution, titanium carbide-tungsten carbide-niobium carbide solid solution, titanium carbide-tungsten carbide solid solution, titanium carbide-tungsten carbide-niobium carbide-tantalum carbide solid solution, tungsten carbide-tantalum carbide solid solution, and titanium carbide-tantalum carbide solid solution.

5. The over-current protection component of claim 4, wherein each of the metal foils comprises a rough surface.

6. The over-current protection component of claim 5, wherein the rough surface of each of the metal foils is arranged for a direct physical contact with the PTC conductive composite material layer.

7. The over-current protection component of claim 4, comprising:
    volume resistivity less than 0.1 Ω·cm at 25° C.

* * * * *